United States Patent [19]

Hui

[11] Patent Number: 4,544,609

[45] Date of Patent: Oct. 1, 1985

[54] COMPOUNDS AND THEIR USE AS INSOLUBILIZERS FOR BINDERS FOR PAPER COATING COMPOSITIONS

[75] Inventor: Sai H. Hui, Rock Hill, S.C.

[73] Assignee: Sun Chemical Corporation, New York, N.Y.

[21] Appl. No.: 649,610

[22] Filed: Sep. 12, 1984

[51] Int. Cl.$^4$ .............................................. B32B 23/08
[52] U.S. Cl. ................................... 428/507; 428/511; 524/18; 525/329.4; 525/375; 525/377
[58] Field of Search ...................... 525/329.4; 524/18; 428/507, 511

[56] References Cited

U.S. PATENT DOCUMENTS

Re. 30,259 10/1978 Moriya et al. ...................... 525/385
4,064,110 12/1977 Arlt et al. ............................ 525/375

Primary Examiner—Joseph L. Schofer
Assistant Examiner—Bernard Lipman
Attorney, Agent, or Firm—Cynthia Berlow; Mitchell Bittman

[57] ABSTRACT

Paper coating compositions contain at least one pigment, at least one binder, and, as an insolubilizer for the binder, the product of the reaction of a low molecular weight polyacrylamide with glyoxal and a urea or a cyclic urea.

13 Claims, No Drawings

COMPOUNDS AND THEIR USE AS INSOLUBILIZERS FOR BINDERS FOR PAPER COATING COMPOSITIONS

This invention relates to paper coating compositions. More particularly it relates to novel products for insolubilizing the binders in coatings for paper.

BACKGROUND OF THE INVENTION

Paper coating compositions are generally a fluid suspension of pigment, such as clay with or without titanium dioxide, calcium carbonate, or the like, in an aqueous medium which includes a binder such as starch, modified starch, styrene-butadiene copolymer, acrylic polymer, or protein to adhere the pigment to paper.

The hydrophilic nature of the binder requires the presence of an insolubilizing material which crosslinks the binder, making it hydrophobic and thus improving the characteristics of the surface of the coated paper.

The most widely-used crosslinking materials are glyoxal and formaldehyde-donor agents such as melamine-formaldehyde, urea-melamine-formaldehyde, and partially or wholly methylated derivatives thereof.

Glyoxal is a highly reactive monomer which cures quickly and has excellent insolubilizing properties. As a result of this rapid crosslinking of glyoxal and binder, however, the viscosity of the coating composition increases so rapidly and is so great that the composition cannot be used. Frequently glyoxal-insolubilized coatings gel completely, particularly in high solids formulations; gelling can occur also in moderate or low solids formulations if they are not used promptly. Thus in situations where it is required that the viscosity remain stable for many hours, for example when high-solids coatings are to be applied by blade coating techniques, a glyoxal system is unsuitable.

Melamine-formaldehyde resins do not build viscosity in the coating compositions, but they have the disadvantage of having an unpleasant odor and of releasing free formaldehyde. Curing with such resins involves the crosslinking of the binder molecule with the methylol or methylated methylol group of the melamine resin, usually in an acid or neutral coating, and full insolubilization of the binder takes place slowly over a period of several days. Free formaldehyde can be released either directly from the coating mixture or when the coating is cured on the drying machine. The presence of even less than one percent of free formaldehyde, based on the total weight of the product, is undesirable, not only because of its objectionable odor, but because it is an allergen and an irritant, causing severe reactions in the operators who manufacture the coatings and who treat and handle the coated paper.

The use of the reaction product of urea and glyoxal as an insolubilizer is known (U.S. Pat. No. 3,869,296). Treating agents formed by the reaction of ethylene urea with glyoxal are disclosed in Japanese publication No. 5 3044-567, but they too do not have satisfactory properties.

The use of an acrylamide/glyoxal adduct was disclosed in U.S. Pat. No. 3,549,568 to improve the wet rub of paper coating compositions.

U.S. Pat. No. 4,343,655 teaches the use of the alkylated products of the reaction of glyoxal and cyclic ureas as crosslinking resins for binders for paper coating compositions.

SUMMARY OF THE INVENTION

It has now been found that the products of the reaction of a urea or a cyclic urea and glyoxal with a polyacrylamide are excellent crosslinking resins for binders for paper coating compositions. They do not build viscosity as does glyoxal; they do not contain or evolve free formaldehyde; and, in smaller amounts, they have insolubilizing effects similar to those of the previously known agents.

DETAILED DESCRIPTION OF THE INVENTION

In accordance with the present invention, novel compounds are prepared that are useful for insolubilizing starch and other commonly used binders for paper coating compositions. The products are generally, but not necessarily, prepared by the following steps:

(1) a polyacrylamide having a low molecular weight is prepared by any convenient method; the molecular weight can be controlled by, for example, using an alcohol such as isopropanol as a chain terminator, using a low concentration of acrylamide monomer, or using a low monomer concentration per unit time (using monomer feed instead of bulk).

(2) the polyacrylamide is then reacted with a urea or a cyclic urea and glyoxal to give the product of this invention.

In another embodiment, the urea and glyoxal are reacted together to form a monourein cyclic area, which is then reacted with polyacrylamide and dilute glyoxal to give the desired product.

The ingredients are generally reacted in a ratio of amounts of about 1.65 to 12,000 parts by weight of the polyacrylamide to about 1.35 to 500 parts by weight of the glyoxal to about 1 to 250 parts by weight of the urea or cyclic urea. Preferably the ratio of amounts is 10 to 90 parts by weight of the polyacrylamide to 20 to 80 parts by weight of the glyoxal to 40 to 150 parts by weight of the urea or cyclic urea.

The reaction of the polyacrylamide with the glyoxal and the urea or cyclic urea generally takes place within the temperature range of about 25° to 100° C., and preferably about 40° to 80° C. In general the pH of the reactants is about 2.5 to 7.0, and preferably is about 4 to 6.5.

The products are generally identified by infrared analysis of the material precipitated in methanol (0.5 gram of the product per 50 grams of methanol). A shoulder peak in the 1710 cm$^{-1}$ region indicates the presence of a urea compound in the polymer.

The urea reactant may be urea, monourein, or the like. If a cyclic urea is selected, it may have one of the following general formulas:

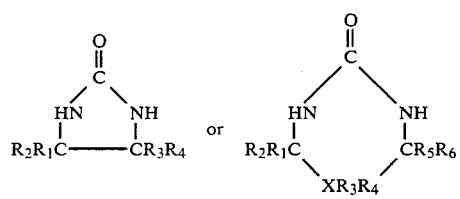

wherein $R_1$, $R_2$, $R_3$, $R_4$, $R_5$, and $R_6$ may be the same or different and each may be H, OH, COOH, R, OR, or COOR wherein R is an alkyl or a substituted alkyl group having 1 to 4 carbon atoms, and X may be C, O, or N; when X is O, $R_3$ and $R_4$ are each zero; when X is N, $R_3$ or $R_4$ is zero.

Typical examples of such compounds include, but are not limited to, ethylene urea, propylene urea, uron, tetrahydro-5-(2-hydroxyethyl)-1,3,5-triazin-2-one, 4,5-dihydroxy-2-imidazolidinone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, 4-hydroxy-5,5-dimethyl-pyrimid-2-one, and the like, and mixtures thereof.

The treating agent of this invention has reactive sites capable of reacting with the cellulosic hydroxyl group, thus binding the starch or protein molecules in the coating composition. Because of its polymeric nature, the product is capable of reacting with several binder molecules, leading to greater insolubilizing efficiency and so requiring less of the product of this invention than of glyoxal or of a melamine-formaldehyde resin to accomplish the same degree of insolubilization. The polymer is not excessively reactive, as is glyoxal, so no viscosity build-up takes place in the coating composition. Since there is no formaldehyde in the system, the problems found with free formaldehyde are avoided.

The binders used in the paper coating compositions of this invention include, but are not limited to, unmodified starch; oxidized starch; enzyme-converted starch; starches having functional groups such as hydroxyl, carboxyl amido, and amino groups; proteins, such as casein; latexes, such as styrenebutadiene resin; and the like, and their mixtures.

The pigments may be clay with or without titanium dioxide and/or calcium carbonate, and the like, and mixtures thereof.

In addition to the binder, the pigment material, and the insolubilizer described above, paper coating compositions may also include conventional materials such as lubricants, defoamers, preservatives, colored pigments, and the like, in conventional amounts.

In the paper coating compositions described herein, the amount of binder is based upon the amount of pigment; the ratio varies with the amount of bonding desired and with the adhesive characteristics of the particular binder employed. In general the amount of binder is about 10 to 25 percent, and preferably about 12 to 18 percent, based on the weight of the pigment.

The amount of insolubilizer varies with the amount and properties of the binder and the amount of insolubilization desired; in general it is about 2 to 10 percent, and preferably about 3 to 7 percent, based on the weight of the binder.

The total solids content of the composition generally is within the range of about 40 to 70 percent, depending upon the method of application and the product requirements.

The compositions of this invention can be applied to paper or paper-like substrates by any known and convenient means.

In order that the present invention may be more fully understood, the following examples are given by way of illustration. No specific details contained therein should be construed as limitations on the present invention except insofar as they appear in the appended claims.

Unless otherwise specified, all parts and percentages are by weight.

EXAMPLE 1

(A) Preparation of Polyacrylamide

394 Parts of 28.9% isopropanol was placed in a 4-neck flask equipped with a 2-feed system, a thermometer, a condenser, and a stirrer. The isopropanol was heated to 70°–72° C. with vigorous agitation. When the temperature reached 70° C., 550 parts of 24.6% acrylamide solution and 55.6 parts of 2.41% ammonium persulfate solution (catalyst) were started to feed into the flask simultaneously. This feeding was continued at an even rate over a period of 1½ hours. The batch was then held at 70°–72° C. for 2 hours.

The product was a clear liquid having a Brookfield viscosity of 64 cps (RV #2 @ 50 rpm) and a pH of 4.8; it gave a white precipitate when charged into 95% methanol. The filtered precipitate was a homopolymer of acrylamide having an intrinsic viscosity of 4.64.

(B) 402.3 Parts of the polyacrylamide solution of part (A) having a solids content of 15.3% was further diluted with 315.8 parts of water in a 3-neck flask equipped with an agitator. 48.3 Parts of urea was charged into the polyacrylamide solution, and the solution was heated slowly up to 60° C., the pH being 5.5–6.0. 233.6 Parts of a 40% aqueous solution of glyoxal was then fed into the solution for a period of 1 hour, at the end of which time the pH was about 3.5. The pH was then adjusted to 4.0 with sodium carbonate. The batch was held at 60° C. for 3 hours, giving a urea/glyoxal/polyacrylamide condensate product that had a Brookfield viscosity of 24 cps (RV #2 @ 50 rpm) and contained 19.6% solids. The product was identified by IR analysis.

EXAMPLE 2

(A) 894.65 Parts of 7.2% isopropanol was charged into a flask as in Example 1. 549.9 Parts of 24.6% acrylamide solution and 55.58 parts of 2.41% ammonium persulfate solution were fed continuously into the isopropanol at 70°–72° C. over a period of 1½ hours. The batch was then held for 2 hours at 70°–72° C.

The polyacrylamide product was a clear viscous material having an intrinsic viscosity of 5.1.

(B) 459.3 Parts of the polymer of part (A) having a solids content of 10.97% was diluted with 181.3 parts of water in a 3-neck flask. 59.9 Parts of monourein was dissolved in the polyacrylamide solution. When solution was complete and the batch temperature reached 60° C., 299.5 parts of 40% glyoxal was charged over a period of 1 hour. The temperature was held at 60° C. for an additional 3 hours, at which time the pH was 2.5–2.6.

The product, a monourein/glyoxal/polyacrylamide condensate, was a clear, slightly yellow solution. It was purified twice by precipitating from methanol, and IR spectra showed monourein and polyacrylamide characteristics.

EXAMPLE 3

(A) 479.3 Parts of a 20.7% acrylamide solution was fed into 465.25 parts of water. 53.45 Parts of a 3.6% ammonium persulfate solution was charged over a period of 1½ hours at 70°–82° C. The batch temperature was held for 2 hours and then lowered to 60° C.

(B) 85.24 Parts of urea was then stirred in, and when solution was complete, feeding of 426.2 parts of 40% glyoxal was started and continued over a period of 1 hour. The batch was held for 2 hours, giving a product that had a Brookfield viscosity of 60 cps, pH of 2.2, and a solids content of 23.67%. The product was identified by IR spectra.

EXAMPLE 4

The procedure of Example 1 was repeated with the following reactants: 402.3 parts of polyacrylamide, 48.3 parts of urea, and 233.6 parts of 40% glyoxal.

The product had a Brookfield viscosity of 44 cps (RV #2 @ 50 rpm) and a solids content of 29.6%.

EXAMPLE 5

300.3 Parts of urea and 725.3 parts of 40% glyoxal were heated together at 80° C. for 1 hour. The resulting solution was cooled overnight at 27° C., resulting in the formation of crystalline monourein. This was recrystallized twice in dilute methanol. The structure of the compound was confirmed by IR spectra.

95 Parts of the purified monourein was heated to 60° C. with 315.8 parts of water and 402.3 parts of polyacrylamide prepared as in part (A) of Example 1. 236 Parts of 28.2% glyoxal was added slowly with agitation over a period of 1 hour. The pH was then adjusted to 4.0 with sodium bicarbonate, and the batch was held for 3 hours at 60° C.

IR spectra indicated that the product was identical to that of Example 1.

EXAMPLE 6

890 Parts of a polyacrylamide solution made by the process of part (A) of Example 2 and diluted to 3.65% was heated at 60° C. with 40.47 parts of ethylene urea. 67.6 Parts of 40% glyoxal was then charged over a period of 1 hour and the temperature was held at 60° C. The batch was then held at that temperature for 3 hours.

The condensate of ethylene urea/glyoxal/polyacrylamide was confirmed by IR spectra.

EXAMPLE 7

The procedure of Example 1 was repeated with each of the following cyclic ureas instead of urea: propylene urea, uron, tetrahydro-5-(2-hydroxyethyl)-1,3,5-triazin-2-one, 4,5,-dihydroxy-2-imidazolidinone, and 4-hydroxy-5,5-dimethylpyrimid-2-one.

EXAMPLE 8

(A) A clay slip was prepared as follows:

To 600 Parts of water in a steel beaker were added 2.5 parts of tetrasodium polyphosphate and 2.0 parts of sodium polyacrylate with agitation which was continued until the ingredients were dissolved. With slow agitation and using a high shear mixer, 1400 parts of #1 clay was sifted into the mixture and agitation was increased and continued for about 10 minutes until a smooth slurry was obtained.

(B) 168 Parts of starch (Penford Gum 280, Penick & Ford's hydroxyethylated starch) was dispersed in 504 parts of water, and the dispersion was heated to boiling. The solution was then cooled for about 15 minutes, added to the clay slurry of Part (A), and calcium stearate added as a lubricant.

The resultant slurry was then used in aliquots with various insolubilizers.

The coating compositions were applied to 46#/ream paper with a #8 Meyer applicator, using a draw-down technique, cured at 105° C., and aged for 1 day.

At Adams Wet Rub test was carried out on each sample. The results of the Wet Rub test are reported as the weight in grams of coating removed from the substrate, the less the amount of solids removed, the better the degree of insolubilization.

The results are tabulated below.

TABLE

| Insolubilizer | Amount, % | Adams Wet Rub Residue (9) |
|---|---|---|
| (a) blank | — | 0.0034 |
| (b) melamine/formaldehyde | 8 | 0.0035 |
| (c) Cyclic urea/glyoxal condensate | 4 | 0.0015 |
| (d) glyoxal | 4 | 0.0021 |
| (e) polyacrylamide/glyoxal/ethylene urea | 4 | 0.0012 |
| (f) polyacrylamide/glyoxal/monourein | 4 | 0.0013 |

From these data it is clear that the products of this invention (e) and (f) are superior insolubilizers to melamine-formaldehyde (b), cyclic urea/glyoxal condensates (c), and glyoxal (d).

The novel products of this invention do not contain or evolve free formaldehyde as do the conventional melamine-formaldehyde and urea-melamineformaldehyde crosslinking agents. Smaller amounts of the compounds of this invention produce insolubilizing effects comparable to those of the conventional materials. They satisfactorily insolubilize the pigment binders, but do not build viscosity as does glyoxal.

What is claimed is:

1. An insolubilizer for binders for paper coating compositions which comprises the product of the reaction of (a) about 1.65 to 12,000 parts by weight of a polyacrylamide, (b) about 1.35 to 500 parts by weight of glyoxal, and (c) about 1 to 250 parts by weight of a urea or a cyclic urea, the reaction being carried out at a temperature within the range of about 25° to 100° C. and the binder being selected from the group consisting of starch; oxidized starch; enzyme-converted starch; starches having hydroxyl, carboxyl, amido, or amino groups; proteins; and their mixtures.

2. A paper coating composition comprising a pigment, a binder, and as an insolubilizer for the binder the product of claim 1, said binder being selected from the group consisting of starch; oxidized starch; enzyme-converted starch; starches having hydroxyl, carboxyl, amido, or amino groups; proteins; nd their mixtures.

3. A process for insolubilizing the binder in a paper coating composition which comprises including in the composition about 2 to 10 percent of the insolubilizer of claim 1, based on the weight of the binder, said binder being selected from the group consisting of starch; oxidized starch; enzyme-converted starch; starches having hydroxyl, carboxyl, amido, or amino groups; proteins; and their mixtures.

4. The product of the reaction of (a) about 1.65 to 12,000 parts by weight of a polyacrylamide, (b) about 1.35 to 500 parts by weight of glyoxal, and (c) about 1 to 250 parts by weight of a urea or a cyclic urea, the reaction being carried out at a temperature within the range of about 25° to 100° C.

5. The process of claim 3 wherein the amount of insolubilizer is about 3 to 7 percent, based on the weight of the binder.

6. A cellulose substrate coated with the composition of claim 2.

7. The product of claim 4 wherein the ratio of amounts of (a);(b):(c) is about 10–90:20–80:40–150 parts by weight.

8. The product of claim 4 wherein reactant (c) is a urea.

9. The product of claim 4 wherein reactant (c) is a cyclic urea.

10. The product of claim 8 wherein reactant (c) is urea.

11. The product of claim 9 wherein reactant (c) is monourein.

12. The product of claim 9 wherein reactant (c) is ethylene urea.

13. The product of claim 9 wherein reactant (c) is pyrimidone.

* * * * *